(12) United States Patent
Lackey

(10) Patent No.: US 8,571,154 B1
(45) Date of Patent: Oct. 29, 2013

(54) CONTROL INTERVAL EXPANSION OF VARIABLE TIME DELAY CONTROL STRUCTURE FOR CHANNEL MATCHING

(75) Inventor: Raymond J. Lackey, Bohemia, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 13/450,999

(22) Filed: Apr. 19, 2012

(51) Int. Cl.
*H04B 7/10* (2006.01)
*H04L 1/02* (2006.01)

(52) U.S. Cl.
USPC ........... 375/347; 375/284; 375/325; 375/342; 375/343; 375/349

(58) Field of Classification Search
USPC ................ 375/219–230, 232, 259, 260, 285, 375/295–296, 309, 311–316, 340, 342–346, 375/349–351, 354, 377
See application file for complete search history.

(56) References Cited

U.S. PATENT DOCUMENTS

| | | | | |
|---|---|---|---|---|
| 7,525,482 B1 * | 4/2009 | Lackey et al. | ................. | 342/368 |
| 8,023,921 B2 * | 9/2011 | Lackey | ........................ | 455/307 |
| 8,032,103 B2 * | 10/2011 | Lackey | ........................ | 455/307 |
| 8,094,764 B2 * | 1/2012 | Lackey | ........................ | 375/354 |
| 2007/0060061 A1 * | 3/2007 | Sampath | ..................... | 455/63.1 |
| 2010/0135439 A1 * | 6/2010 | Lackey | ........................ | 375/344 |
| 2010/0135443 A1 * | 6/2010 | Lackey | ........................ | 375/346 |
| 2010/0136926 A1 * | 6/2010 | Lackey | ......................... | 455/78 |
| 2010/0136941 A1 * | 6/2010 | Lackey | ........................ | 455/307 |
| 2012/0100809 A1 * | 4/2012 | Lackey | ........................ | 455/63.1 |

* cited by examiner

*Primary Examiner* — Sam K Ahn
*Assistant Examiner* — James M Perez
(74) *Attorney, Agent, or Firm* — Dilworth & Barrese, LLP; Michael J. Musella

(57) ABSTRACT

An adaptive time delay control system is provided for matching the propagation time delay between two samples of a signal traveling through two independent paths so that they can be coherently combined for additional signal processing functions such as cosite interference cancellers, adaptive interference cancellers and adaptive beam formers. The adaptive time delay control system and associated method advantageously provide improved continuous matching of the two channels over a wider adjustment range while preserving both convergence speed over the full range and minimum jitter upon convergence by using composite autocorrelation functions to control (adjusting) a matching time delay in one channel.

31 Claims, 9 Drawing Sheets

CONTROL INTERVAL EXPANSION OF VARIABLE TIME DELAY CONTROL STRUCTURE FOR CHANNEL MATCHING

The invention was made with United States Government support under Contract No. N00014-10-D-0162 awarded by the U.S. Navy. The United States Government has certain rights in this invention.

BACKGROUND OF THE DISCLOSURE

1. Field of the Disclosure

The disclosure relates generally to the field of radio communication and, in particular, to time delay adjustment control to match different signal paths to a common delay to aid further signal processing in applications such as coherent combining, wideband beam-forming, and wideband signal cancellation including the reduction of interference signals coupled from a transmission antenna into a local receive antenna in the presence of a local multipath.

2. Description of the Related Art

The prior art has demonstrated that an autocorrelation result between the transmitted reference signal and the continuously varied time-delayed version is indirectly proportional to the time-bandwidth product of the two multiplied signals. The time-bandwidth being defined herein as a product of the bandwidth and a time mismatch between the two signals. Such prior art systems were limited to the adjustment interval due to the system bandwidth, which limits the range of scenarios in which it is operational.

Desirably, for a large bandwidth signal, the autocorrelation result becomes highly sensitive to the measured time mismatch, which is trying to be reduced or minimized and, once locked, maintains tracking with minimal drift before having tracking restored. But, it's very sensitivity limits its range of operation such that it can hang up far from the point of matched delay and never find the proper solution due to non-monotonic function beyond the time interval of ±1/BW.

As signal bandwidths become wider, the channel matching in signal processing paths requiring joint processing becomes more critical and difficult to manufacture and maintain reliably, at low cost. This is true in beamforming and interference cancellation using multiple receive antenna elements.

In the beamforming system, the propagation of the desired signal across a large array can cause significant phase dispersion across the bandwidth of the signal. A beamsteering system is limited in its processing bandwidth and beamsteering range by the placement of elements yielding decorrelation of the desired signal across the array.

A typical beamsteering system utilizes a correlation-based adaptive controller using feedback derived after the summation process. The system takes a sample of received signal and adjusts the magnitude and phase such that the result is equal in phase with the pilot signal at the input of the receiver. The vector sum of the two signals will add, providing an enhanced signal of interest. In practice, however, the two signals have not only a phase and amplitude difference, but also a time delay yielding phase dispersion across the band, due to unwanted distortion in the propagation path length and multipath. Beamsteering performance is a function of amplitude and phase match between each sample of the desired signal received in each element. Beamsteering is more tolerant of mismatches so further explanation will focus on cancellation.

In the interference cancellation system, unwanted (i.e., interfering) signals manifest themselves in several ways. Interference can cause a reduction in the sensitivity of a receiver (receiver desensitization), masking of a desired signal, tracking of an undesired interfering signal and loss of the desired signal, and processing of the unwanted interfering signal instead of the desired signal. Each of these manifestations of interference limits the communication capabilities of the radio system afflicted by this problem. The effects of interference can be some combination of the absence of usable output from a receiver, false signals from a receiver, and malfunction of a device which is operated by the receiver. During emergency situations, the loss and corruption of the desired signal can be critical. One of the greatest limitations of the nulling of this interference is the decorrelation of the interfering signal from a sample used for subtraction.

A typical Interference cancellation system utilizes a correlation-based adaptive controller using feedback derived after the cancellation process. The system takes a sample of an interference signal and adjusts the magnitude and phase such that the result is equal in amplitude and phase with the interference signal at the input of the receiver. The vector difference of the two signals will cancel, leaving only the signal of interest. In practice, however, the two signals are not identical, due to unwanted distortion in the reference path, as well as differences in signal path lengths and non-ideal components in the Tx/Rx signal paths. Cancellation performance is a function of amplitude and phase match between the interference signal and the sampled signal. To suppress a wideband interference signal, the performance of a cancellation system is directly proportional to the path length match between the cancellation signal and the interference signal. For a modulated carrier, phase match is determined by the signal bandwidth and the path length difference in time (often measured in nanoseconds) between the transmit antenna to the receive antenna signal path and the coupled transmit signal path to the receive antenna.

In order to provide good signal suppression, the cancellation signal path length should be adjusted to time match the interference signal path length. Contemporary techniques for this adjustment involve manual measurements to determine the path length difference between the interference cancellation signal and the received interference signal. One prior art solution utilizes a manually controlled trombone to extend a tap to a proper delay. This solution is deficient to the extent that it only provides an approximate solution for a stationary environment and requires manual intervention. Conventional manual methods do not lend themselves to situations where the time match may change over the course of time as a result of a changing environment. Thus, a conventional interference cancellation system may suffer a loss of suppression performance due to system dynamics.

One prior art solution proposes the use of an adaptive time delay system which provides time-matched delays in auxiliary paths by providing additional taps in the auxiliary paths to cover a range of possible time delays. However, the taps only cover a discrete set of time-delays resulting in less than optimal results.

A further prior art solution proposes the use of a digital search method that requires an interrupt of the system operation for adjustment. This solution is deficient by requiring both system interruption and manual intervention.

A more recent implementation, described in U.S. Pat. No. 8,094,764 B2, incorporated herein by reference in its entirety, describes a method for fine tuning the channel match in a system for interference cancellation. However, it is limited to a time delay adjustment range of ±1/BW of the signal of interest, which limits the variability of scenarios in which it can work without manual intervention.

A need therefore exists for a system and method for continuously adjusting a matching time delay where the time match may change over the course of time as a result of a changing environment over an adjustment range wider than ±1/BW, as described in U.S. Pat. No. 8,094,764 B2.

SUMMARY OF THE DISCLOSURE

It is therefore an object of the present disclosure to provide a method and apparatus for adjusting the delay in a controlled propagation path to that of an uncontrolled propagation path.

It is another object of the present disclosure to provide a method and apparatus for improving the wideband performance of a beam-steered antenna array.

It is another object of the present disclosure to provide a method and apparatus for reducing the effects of interference between collocated transceivers.

A system and associated method is provided for matching the controlled delay of one channel to an uncontrolled and unknown delay of another channel using a novel time-delay based control architecture that dynamically and continuously adjusts a variable time delay based on a composite wide time span monotonic, nearly linear, autocorrelation function. In this manner system convergence rate and stability are both maximized.

According to one aspect, a method of adjusting the delay in a controlled propagation path to that of an uncontrolled propagation path using a time-delay based control architecture is provided. The method comprises steps of,
a) generating a first autocorrelation value from a sampled first signal received over a controlled propagation path and a delayed sampled second signal received over an uncontrolled propagation path;
b) generating a second autocorrelation value from a delayed sampled first signal and the delayed sampled second signal;
c) computing a first difference value by subtracting the first autocorrelation value from the second autocorrelation value;
d) amplifying the first difference value of an autocorrelation function by a first gain;
e) selecting one of the first and second autocorrelation values as a first autocorrelation selection value;
f) generating a third autocorrelation value from a sampled band-limited first signal and a delayed sampled band-limited second signal;
g) generating a fourth autocorrelation value from a delayed band-limited first signal and a delayed band-limited second signal;
h) computing a second difference value by subtracting the third autocorrelation value from the fourth autocorrelation value;
i) amplifying the second difference value of autocorrelation function by a second gain;
j) selecting one of the third and fourth autocorrelation values as a second autocorrelation selection value;
k) comparing the first autocorrelation selection value to the second autocorrelation selection value to select the larger of the first autocorrelation selection value and the second autocorrelation selection value;
l) selecting the amplified difference value of autocorrelation function of the autocorrelation of the largest autocorrelation selection value as the control error signal;
m) filtering the control error signal to form the variable delay control signal;
n) applying the variable delay control signal to a variable delay device in the controlled propagation path of the first signal.
o) Repeating steps (a)-(n) until the magnitude of the control difference value is less than a first predetermined threshold, thereby indicating a time delay match between the outputs of the first received signal and the second received signal.

According to another aspect, a system for adjusting the delay in a controlled propagation path to that of an uncontrolled propagation path using a time-delay based control architecture is provided. The system comprising, (A) a variable delay line for adjusting a signal propagation time of a first sampled signal, the variable delay line comprising: (i) at least one fixed delay element in series with the propagated received signal path; (ii) a variable delay element for continuously varying a delay of a first sampled signal to implement a match between the first sampled signal and a second sampled signal yielding a delayed first signal; (B) an adaptive time delay control (ATDC) system having two levels of correlation, said system configured to calculate a delay to be added to a first propagation path to achieve a match of the first signal passing through a controlled propagation path with a second signal passing through an uncontrolled propagation path; and (C) an adaptive control loop for adjusting a complex weighting of the delayed first signal to maximally cancel any similar signals in the second signal received in antenna signal.

According to yet another aspect, the controlled delay of one channel is matched to the uncontrolled and unknown delay of another channel using a wide time span autocorrelation function generated by spectral filtering the two channels to spread the conventional autocorrelation function of the two channels such that a monotonic behavior of the resultant autocorrelation function exists over a greater time interval, thus allowing a greater initial mismatch in time to be detected. By allowing a greater initial mismatch in time to be detected, range of time-delay convergence is extended. Filtering to half the signal bandwidth reduces the peak to approximately one half the original but doubles the effective time variation where the magnitude of the autocorrelation function is monotonic.

The wide time span autocorrelation function provides a lower amplitude and a lesser slope, thus slowing convergence without increased gain. However, an undesirable side effect is produced of increased dither oscillation around the converged tracking point, thus reducing potential system performance. This undesirable side effect is overcome by the present disclosure with the realization that once convergence had proceeded to bring tracking within the linear region of the initial autocorrelation function, a faster convergence with greater stability of tracking could be achieved by using the original autocorrelation function. Also, with gain adjustment, the rate of convergence in this region can be matched to the convergence rate of the original autocorrelation function. As convergence approaches final point of synchronous matching, this amplified autocorrelation signal of the filtered signal would have significant noise causing a dither around the optimum convergence point, thus degrading performance of subsequent signal processing.

In one embodiment, a controlling means, associated with the delay means, may be provided for improved matching of the signal in the two paths over a larger range, thereby enhancing the performance of the beamsteering system.

The disclosure is applicable for use, for example, in a wideband beamforming process with improved broadband gain and reduced waveform distortion. The disclosure is also applicable for use in a cosite interference cancellation system configured to provide improved rejection of a signal coupled from a transmission antenna into a local receive antenna in the presence of local multipath. The cosite interference cancellation system and associated method advantageously provide improved signal rejection over prior art approaches by continuously controlling (adjusting) a matching time delay, over a larger range than previously possible, to reduce cosite interference.

The present disclosure provides systems and methods which achieve, inter alia, broadening the adjustment region while maintaining sensitivity in the region of lockup in tracking.

In different embodiments, the system may be implemented in discreet analog RF components, digital signal processing, or alternatively, as a MMIC. Time delays can be implemented as either a switched delay or a continuously variable delay through an analog control voltage.

BRIEF DESCRIPTION OF THE DRAWINGS

These and other objects, features and advantages of the disclosure will be apparent from a consideration of the following Detailed Description Of The Disclosure considered in conjunction with the drawing Figures, in which.

DETAILED DESCRIPTION OF THE DISCLOSURE

Figure 1:
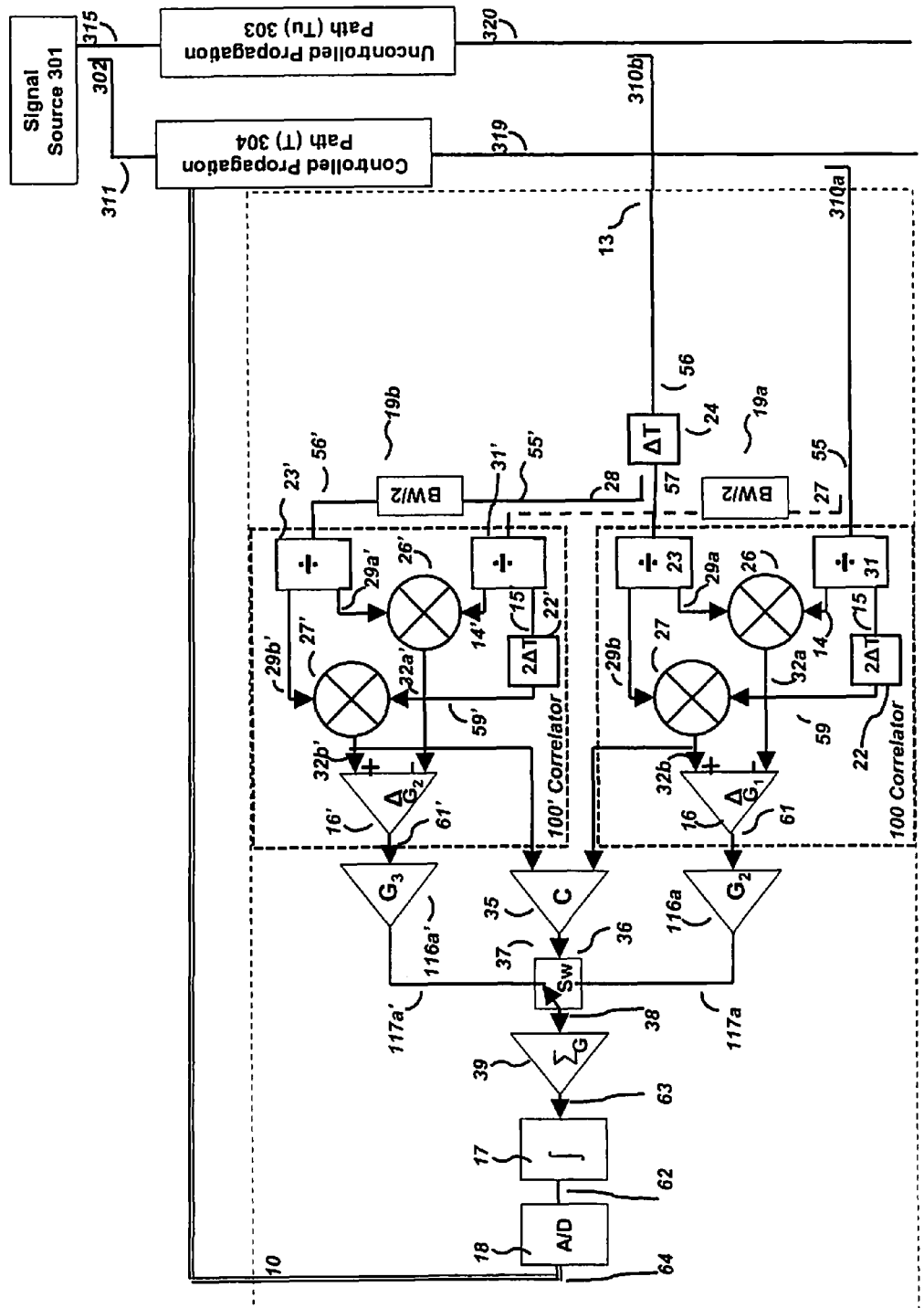
FIG. 1 illustrates a system of the disclosure, according to one embodiment.

In the following discussion, numerous specific details are set forth to provide a thorough understanding of the present disclosure. However, those skilled in the art will appreciate that the present disclosure may be practiced without such specific details. In other instances, well-known elements have been illustrated in schematic or block diagram form in order not to obscure the present disclosure in unnecessary detail. Additionally, for the most part, details concerning network communications, electromagnetic signaling techniques, and the like, have been omitted inasmuch as such details are not considered necessary to obtain a complete understanding of the present disclosure and are considered to be within the understanding of persons of ordinary skill in the relevant art.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Overview

The present disclosure calculates an autocorrelation result between a transmitted reference signal and a coupled sample, time-delayed version of the reference signal, with the understanding that the autocorrelation result is indirectly proportional to the time-bandwidth product of the two multiplied signals. The time-bandwidth product being defined herein as a product of the bandwidth and a time mismatch between the two signals. Advantageously, for very broadband signals, the autocorrelation result becomes very sensitive to time mismatch. The present disclosure exploits this feature.

Additionally, the present disclosure calculates an autocorrelation result between band-limited versions of the same transmitted reference signal and a coupled sample, time-delayed version of the reference signal, with the understanding that the new autocorrelation result is spread in time proportional to the bandwidth limiting reduction performed upon the signal. Thus, for N=2, filtering to 1/N the bandwidth of the original signal, the monotonic autocorrelation result has double the time interval of the unfiltered signal.

Operation

As will be described in greater detail below, embodiments of the disclosure operate by performing a channel matching to match a time delay of a controllable path to an unknown and uncontrollable path. An autocorrelation function is used between the signal occurring in both paths to determine a current relationship of time mismatch between the two paths and thus control an adjustable delay to bring them into alignment. More particularly, an autocorrelation function is calculated by multiplying a sample of the signal in the controllable path by a sample of the signal in the unknown and uncontrollable path. In a preferred embodiment, only the magnitude of the autocorrelation function is used.

The autocorrelation function includes the time mismatch of the two signals in the two paths. A fixed time delay offset for measurement can be added into the controlled path. An autocorrelation can be computed for the original uncontrolled path delay and the new delay of the controlled path, yielding a second autocorrelation measurement for comparison, and direction of required adjustment can be made based upon this comparison. If the added time improves the correlation between the two signals, the direction of adjustment is deemed to be proper. If the added time degrades the correlation between the two paths, then the direction of adjustment is deemed to be improper. In one embodiment, the measurements can be made in sequence with a controller making the necessary adjustments, gathering data, and making decisions. In another embodiment, the measurements can be made in parallel with continuous feedback so that convergence is a smooth process.

In a preferred embodiment, a standard signal bandwidth autocorrelation and adjustment error function is derived from the correlation between the two original signals of full system bandwidth. A second error function is derived from a filtered signal autocorrelation and adjustment error function. Using gains and offsets, the two autocorrelation results can be used to select the error function that would be most effective in that region and a switch can route the appropriate signal into the integration and control path.

In one embodiment, the two autocorrelation results can be used in the following way. In a two tap configuration, a tracking loop measures the respective time delay autocorrelations (i.e., A and B) and compares them by taking a difference value (A-B) to adjust the time delay in a manner which converges on the desired (ideal) time delay.

As will be described in detail below, a primary objective of the adaptive time delay control system 10 of FIG. 1 is to compensate for an indeterminate time delay, $T_u$, associated with the uncontrolled path 303, by adjusting a variable time delay element of the controlled propagation path 304 such that the known propagation time delay T associated with the controlled propagation path 304 is matched to the uncontrolled propagation time $T_u$ associated with the uncontrolled propagation path 303. The adaptive time delay control system 10 of FIG. 1 is configured to perform this time matching function Referring now to the drawings, FIG. 1 illustrates an improved adaptive time delay control system of the disclosure, according to one embodiment. An arbitrary signal source 301, such as a transmitter at one end of a data link, outputs a signal 315. A copy of the output signal is extracted in coupler 302 as signal 311. It is noted that signals 311 and 315 are identical in that they are derived from the same source. Signal 311 is a signal intended to be propagated over a controlled propagation path 304 having a known propagation time delay T. Mirror signal 315 is propagated over an uncontrolled propagation path 303. The time delay, $T_u$, associated with uncontrolled propagation path 303 is indeterminate.

As is well known, the autocorrelation function of a signal with energy distributed over a fixed bandwidth is dependent in part upon the total energy in that bandwidth. Accordingly, a reduction in bandwidth by filtering will reduce the magnitude of the autocorrelation function, however; its region of monotonic descent with time mismatch will be increased. Thus, to broaden the region of convergence, it is desired to filter the bandwidth as much as necessary to cover the region of desired adjustment.

Unfortunately, a reduction in bandwidth, via filtering, reduces the magnitude of the autocorrelation function so that relative noise power increases. This causes both slower convergence due to the lesser slope on the autocorrelation function and more dither around the final solution due to the noise, both undesired effects. The slower convergence can be significantly overcome by control loop gain and the increased dither around the final solution is avoided by not using this function as the match enters the zone of the original autocorrelation function.

Signal 311, output from signal source 301, enters the controlled propagation path 304 and exits as signal 319 after a time interval T. Signal 319 is sensed in an ideal coupler 310a for off-line processing as signal 55. Within Correlator Block 100, signal 55 is equally divided in power divider 31 into matched signals 14 and 15. Signal 15 is further delayed by a fixed interval of 2ΔT to form signal 59, delayed a controlled time T+2ΔT from the original signal 315. Signal 315 enters the uncontrolled propagation path 303 and exits as a component of signal 320 after some unknown interval $T_u$. In other words, other signals may have been combined with the original signal 315 in the uncontrolled propagation path 303. The exit signal 320 is sensed in an ideal coupler 310b for off-line processing as signal 56. Signal 56 enters delay line 24 having a fixed delay ΔT, and exits as signal 57, delayed an uncontrolled time from the original signal 315 at $T_u$+ΔT. Within the Correlator block 100, signal 57 is then split into matching signals 29a and 29b by power divider 23.

Signal 29a, a signal having a delay of $T_u$+ΔT relative to original signal 315, when correlated in ideal correlator 26 with signal 14, a signal having a delay of T relative to original signal 315, generates the autocorrelation value 32a of signal 315 for a decorrelation interval of $T_u$−T+ΔT.

Signal 29b, a signal having a delay of $T_u$+ΔT relative to original signal 315, when correlated in ideal correlator 27 with signal 59, a signal having a delay of T+2ΔT relative to original signal 315, generates the autocorrelation value 32b of signal 315 for a decorrelation interval of $T_u$−T−ΔT.

Referring again to FIG. 2 which is a diagram of ideal signal correlation of a signal of rectangular bandwidth as a function of the product of ΔT and Bandwidth showing three possible locations 202, 204, 206 of the controlling taps relative to the current delay time in respect to its match to the reference path delay. The left cluster 202 shows that the delay T, the total inline delay of the coupled transmission signal from the pick-off point 7 to the ATDC 10 sampling point 85, is insufficient and needs to be increased because the early signal 14 autocorrelation (−τ) is less than the delayed signal 59 autocorrelation (+τ). The right cluster 206 shows the opposite situation where the delay is too great. The third, center, cluster 204 shows the point of system stability where the autocorrelation values of +τ and −τ for +ΔT and −ΔT are equal. Tu is equal to T, the difference is thus zero, and the autocorrelation function is at its peak. The autocorrelation function goes to zero when:

$(Tu-T)*BW=1;$ $(Tu-T)=1/BW;$

Beyond this region, the magnitude of the autocorrelation function is no longer monotonic and is not applicable for control of the time delay adjustment. Filtering to half the signal bandwidth reduces the peak to approximately one half the original but doubles the effective time variation where the magnitude of the autocorrelation function is monotonic.

The two autocorrelation results 32a and 32b, which are output from THE autocorrelators 26 and 27 of correlator 100 shown in FIG. 1, correspond to the autocorrelation values of +τ and −τ at times +ΔT and −ΔT respectively. The autocorrelation results 32a and 32b are directly dependent upon the difference in values of T (associated with the controlled propagation path) and $T_u$ (associated with the uncontrolled propagation path). The autocorrelation results 32a and 32b are generated, with an imaginary autocorrelation centered between them corresponding to the auto correlation of signal 315 with a decorrelation interval of $T_u$−T. Thus, the control signals are derived from samples of the Autocorrelation function bracketing it, and then provide direction of adjustment.

The two autocorrelation results 32a' and 32b', which are output from THE autocorrelators 26' and 27' shown in FIG. 1 correspond to the autocorrelation values of +τ and −τ at times +ΔT and −ΔT respectively for an autocorrelation function based upon a signal of half the bandwidth, thus allowing an adjustment range of twice the original adjustment range provided by Correlator 100 operating upon the original bandwidth.

Controlled Propagation Path Delay T<Uncontrolled Propagation Path Delay $T_u$

Figure 2:
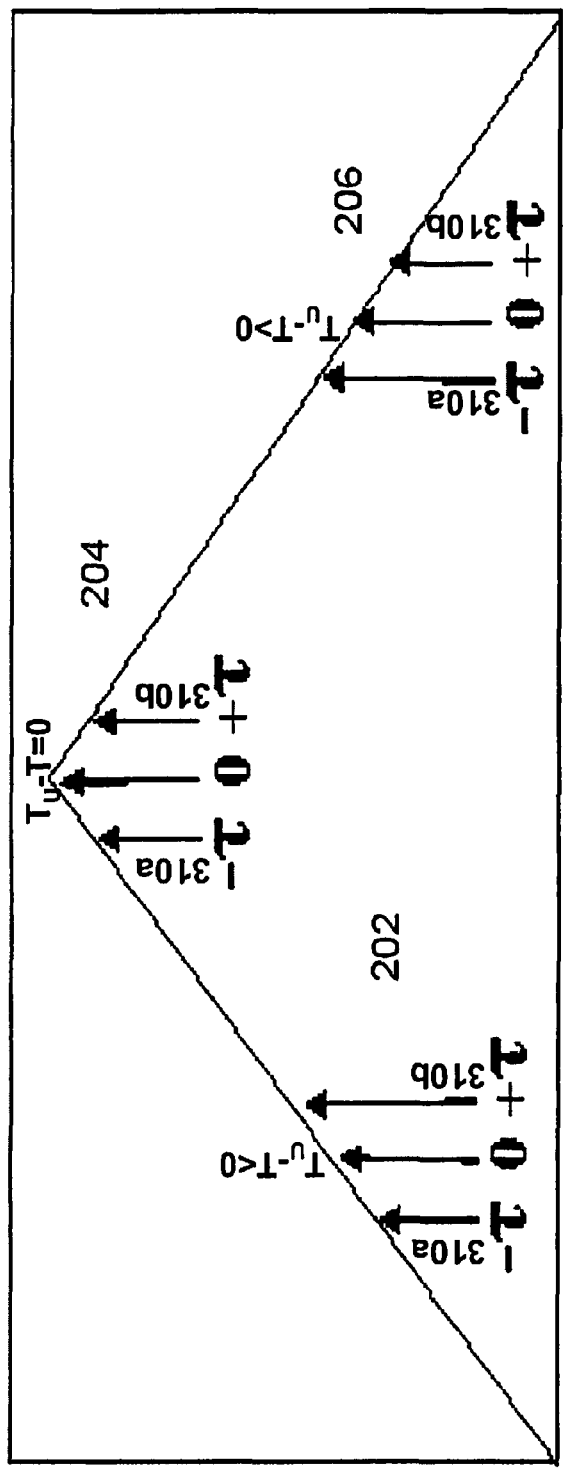
FIG. 2 is a diagram of signal autocorrelation of a signal with a rectangular spectrum as a function of the product of ΔT and Bandwidth from −1/BW to +1/BW showing three exemplary locations of the controlling taps relative to the current delay time in respect to its match to the reference path delay.

If the value of T associated with the controlled propagation path 303 of FIG. 1 is lower than $T_u$, the delay associated with the uncontrolled propagation path 304 of FIG. 1, the autocorrelation result will be greater for output 32b for a decorrelation interval of ($T_u$−T+ΔT) than for the autocorrelation result 32a for a decorrelation interval of ($T_u$−T−ΔT) as shown in FIG. 2 at 202.

Controlled Propagation Path Delay T>Uncontrolled Propagation Path Delay $T_u$

However, if the value of T associated with the controlled propagation path 303 of FIG. 1 is greater than the delay $T_u$ associated with the uncontrolled propagation path 304 of FIG. 1, the autocorrelation result will be greater for output 32a for a decorrelation interval of ($T_u$−T−ΔT) than for output 32b for a decorrelation interval of ($T_u$−T+ΔT) 32b as shown in FIG. 2 at relative value set 206.

The difference found in subtracting the two autocorrelation values 32a and 32b in subtractor 16, yields an error signal 61 that could be used to control the matching time delay block, however, the disclosure adds another level of control to the system. Referring to FIG. 1, there is another Correlator Block 100', where the processing of the first Correlator Block 100 is replicated but operates on signals with reduced bandwidth.

The signals 55 and 56 pass through bandlimiting filters 19a and 19b to generate signals 55' and 56' which are processed in the same way to generate error signal 32b'.

Figure 3:
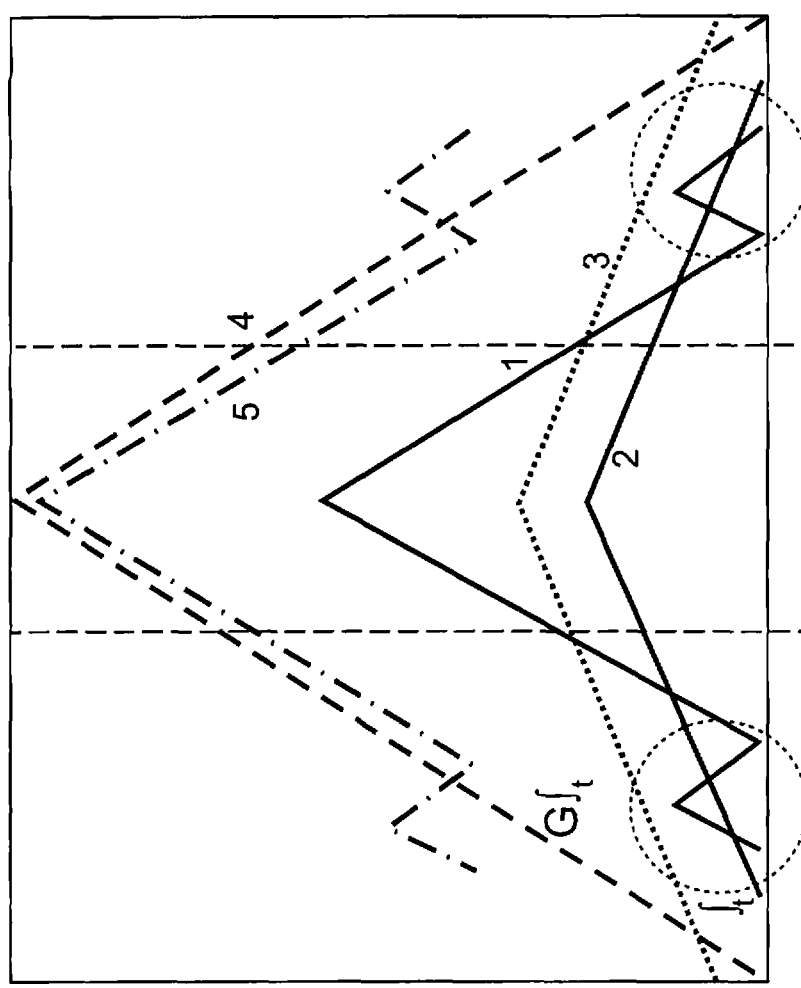
FIG. 3 is a diagram of autocorrelation of a signal with a rectangular spectrum as a function of the product of ΔT and Bandwidth from −2/BW to +2/BW showing the effects of signal processing upon either the original signal or the resulting autocorrelation.

Referring now to FIG. 3, is a diagram of signal autocorrelation of a signal with a rectangular spectrum as a function of the product of ΔT and Bandwidth from −2/BW to +2/BW showing the effects of signal processing upon either the original signal or the resulting autocorrelation.

1. Autocorrelation function representative of Sin x/x
2. Filtered to Half Bandwidth
3. Offset added to curve 2
4. Effect of amplifying curve #2 with Gain $G_2$
5. Offset added to curve 1
6. Dotted circles show areas of non-monotonic behavior of autocorrelation function.

For example, curve 2 shows the autocorrelation function of the signals filtered to a reduced bandwidth. The autocorrelation results shown in FIGS. 2 and 3 are also directly dependent upon the signal strengths of the correlator inputs, that is, as the inputs grow stronger, the magnitude of the correlation function also grows stronger. A sequential measurement of autocorrelation from a correlator can thus have differing levels due to signal modulation rather than strictly due to time mismatch and could be prone to misdirection, not suffered by this architecture. By reducing the bandwidth, much of the energy has been thrown away, thus limiting maximum peak of the autocorrelation at the same time that the range was extended.

A straight level shift would raise curve 2 to that of curve 3 such that its level exceeds that of curve 1 in the region of Curve 1's non-monotonic slope. Simply adding the two curves would not yield a monotonic autocorrelation curve over the T=0 to plus or minus 2BW interval. Selecting the greater of curve 1 and 3 would give a monotonic slope that would provide convergence over the T=0 to plus or minus 2BW interval. However, the resulting curve would have variation in slope and thus the convergence rate would differ across the range.

Curve 4 represents curve 2 amplified with a gain to make the slope the same as that of curve 1. Curve 1 can be raised to this level by a simple level shift. The uniform slope is desired to yield consistent convergence rates. Unfortunately, pushing for the matching slope on curve 4 requires significant gain and increases the noise.

Figure 4:
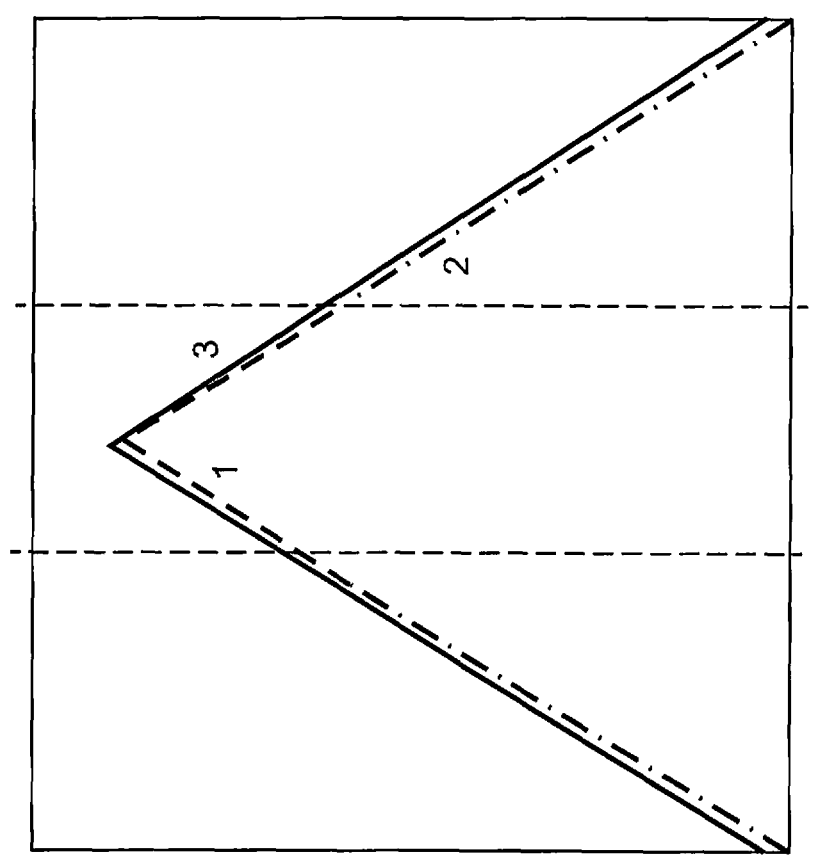
FIG. 4 is a diagram of signal autocorrelations of FIG. 3, further processed to limit range of effectiveness.

Referring now to FIG. 4, there is shown a set of curves which illustrate the effects of modifying the autocorrelation function with filtering, gain and switching, where only filtering and gain are shown in FIG. 3.
  1.—Region of Autocorrelation function representative of Sin x/x before being added in where it would be used (dashed)
  2.—Region of the amplified Half bandwidth autocorrelation function where it would be used (dots and dashes)
  3.—Combination of two Autocorrelation functions where they would be used (solid—shown offset for clarity)

FIG. 4 shows the result of processing curves 1-4 of FIG. 3 with amplification and level shifting as shown in FIG. 3 but with the use of switching to select when amplification and level shifting would be implemented. The autocorrelation function of the full bandwidth is used, shifted, in the center region where it exceeds curve 3 in. The amplified autocorrelation function of the reduced BW correlation, amplified, is used in its region where curve 3 exceeds curve 1 in FIG. 3. Together they yield a uniform, monotonic autocorrelation function driving the error function of the time delay control loop. The switching between the autocorrelation functions to be used would be controlled by the magnitude of the individual autocorrelations of FIG. 3, curves 1 and 3. The required gains and level shifts are a function of the waveform and are constants, even though actual curve levels shift due to signal strength.

Figure 5:
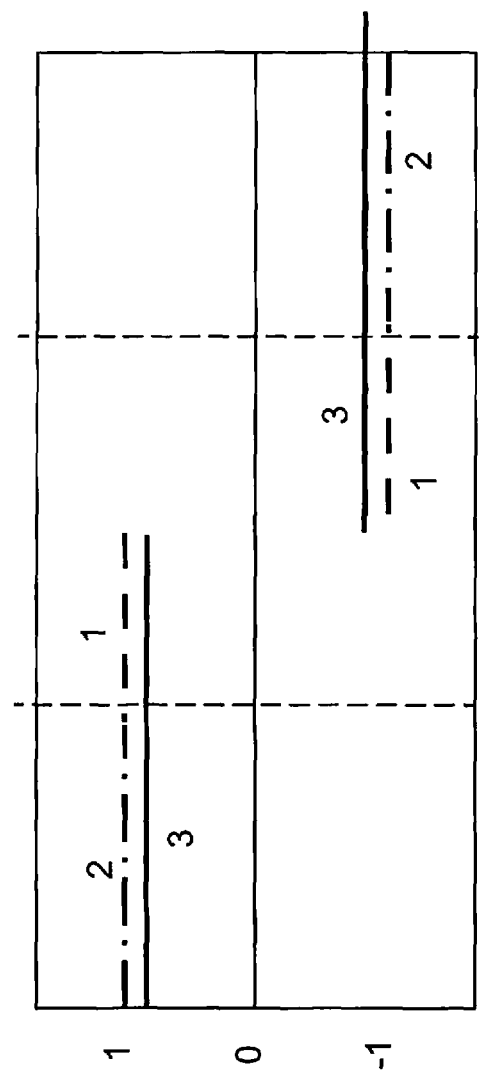
FIG. 5 is a diagram of an error function developed from the signal autocorrelations of FIG. 4, further processed to adjust levels and combine them such that they provide a contiguous, monotonic error function over intervals wider than 2/BW.

Referring now to FIG. 5, the error signals 61 and 61' shown in FIG. 1 are the Delta signals of the raw autocorrelation functions, amplified in amplifiers 116a and 116a', which are shown here as the error function curves of FIG. 5 where:
  1.—Region of Autocorrelation error function representative of Sin x/x (dashed) where it would be used.
  2.—Region of the amplified Half bandwidth autocorrelation error function (dots and dashes) where it would be used.
  3.—Resulting error function when combined by switching (solid—shown offset for clarity). These are the differences of the curves in FIG. 4 at intervals of ±ΔT. Thus the resulting error function has fine precision around the optimum time delay but constant magnitude for consistent tuning across the band of effectivity.

In FIG. 1, the signals 32a and 32a', 32b and 32b' (shown), or in an alternative embodiment, the sum of 32a and 32b and the sum of 32a' and 32b', can be used as the control signals feeding the comparator 35, yielding the control signal 36 which toggles switch 37 to select the proper error function for the region of operation in ΔT*BW space, yielding signal 63 so that their combined error function is that of FIG. 5. This combined error function is then amplified and integrated in integrator 17, a low-pass filtering block, to remove noise yielding signal 62.

The amplified and integrated control signal 62 is then converted in A/D 18 yielding a digital control word 64. A new value for the digital control word 64 changes the value of delay T associated with the controlled transmission path 304. The process repeats continuously until a steady state is reached when $T_u$ equals T as shown in FIG. 2 at 204, as the error signal 32b goes to zero.

It should be understood that the autocorrelation result correlating the two signals 319 and 320 of FIG. 2 is not formed and is never used for purposes of control but is instead included only by way of example in FIG. 2, as the center unit in the clusters of three. It would result if the current signal 319 were correlated with the unknown delayed signal 320 but would not help in the control function.

Referring again to FIG. 3, if curve 2 alone were used for the autocorrelation function driving the error function of the time delay control loop, it would be noisy around ΔT=0 and be more prone to oscillate around that point. Combining the two signals 61 and 61' in the manner described above gives rapid convergence even at the fringes of control range but stable convergence at ΔT=0. Using multiple correlation stages of N in the filtering, such as powers of 2, allow this control to be extended across a very broad control range if required in the system.

Thus, it is shown that a delayed replica of a signal in a controlled propagation path has been delayed for an interval equal to the unknown delay of an uncontrolled propagation path, where other signals may have been added, for applications where desired for additional signal processing. The value of $T_u$ is then the value T for the steady state value of the digital control word, so the delay $T_u$ is now matched and known.

Figure 6:
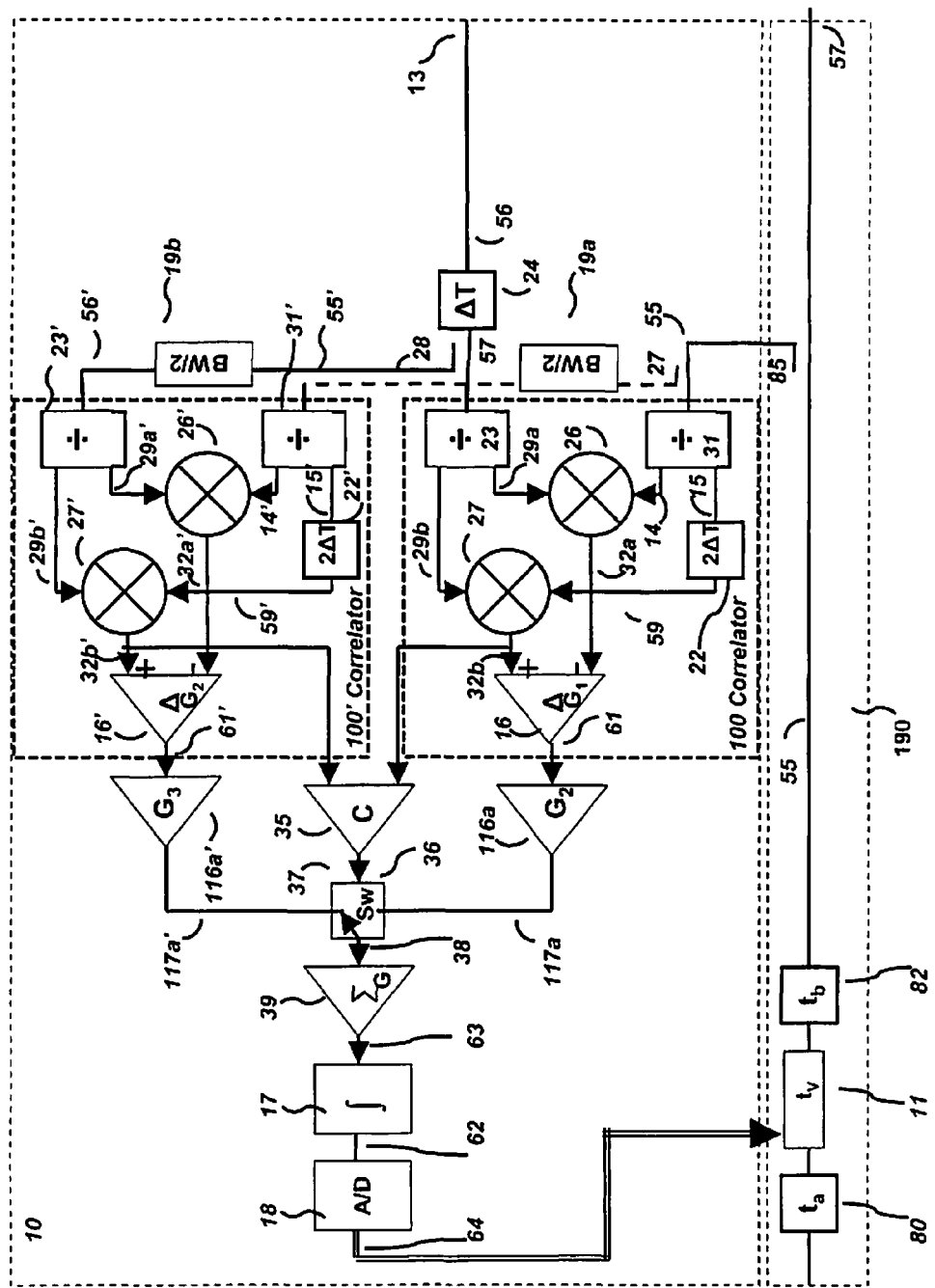
FIG. 6 illustrates a system embodiment of the disclosure configured to perform a channel matching over intervals wider than 2/BW.
Figure 7:
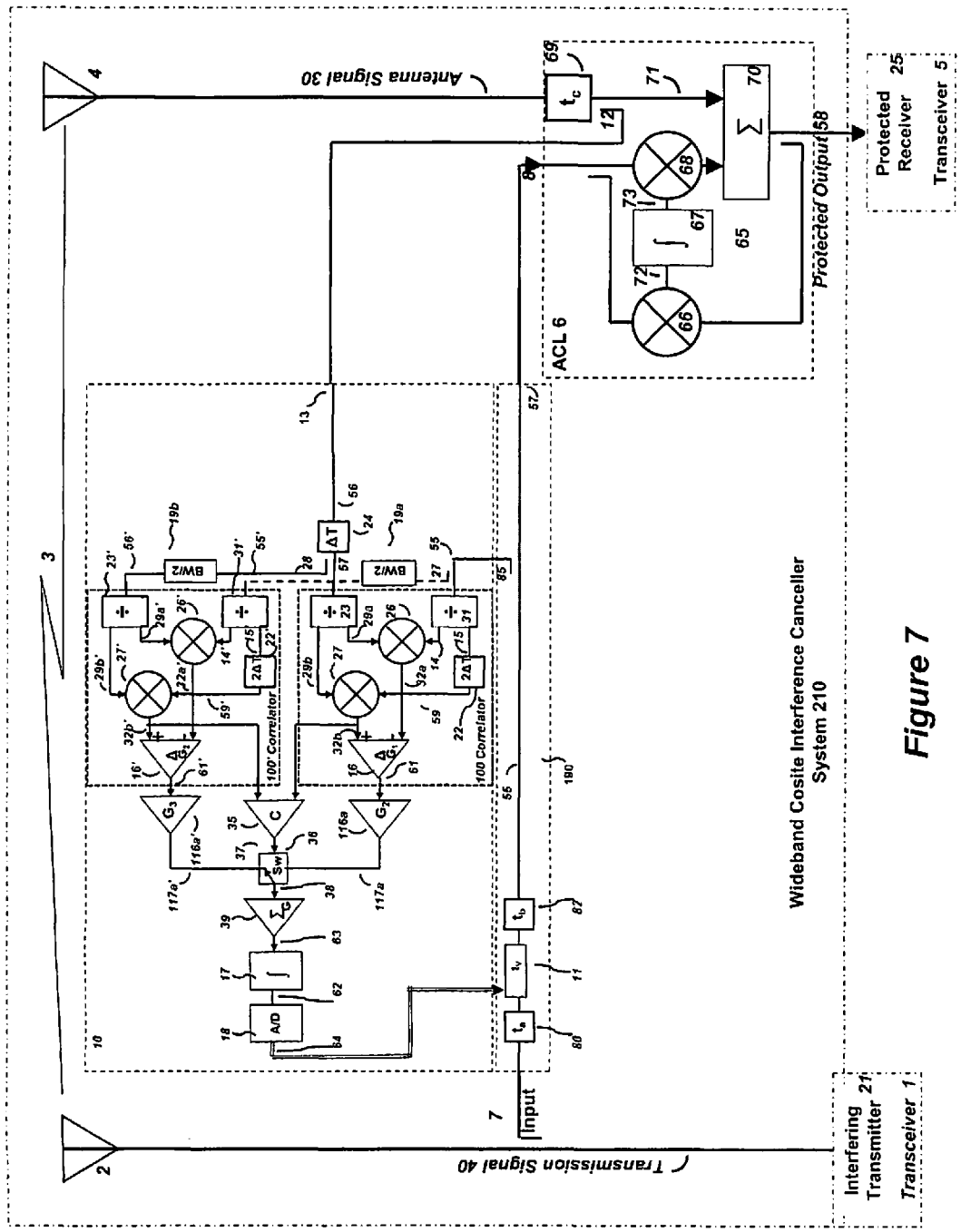
FIG. 7 illustrates a cancellation system for elimination of interfering signals between cosited radio transceivers, according to one embodiment.

FIG. 6 illustrates the improved Adaptive Time Delay Control system of the disclosure for controlling the Controlled Propagation Path 304, as shown in FIG. 1 wherein the variable delay line 190, corresponding to Controlled Propagation Path 304 of FIG. 1 is shown to be partitioned into various delays FIG. 7 illustrates a further embodiment of the Channel matching system 10 of FIG. 1. According to the present embodiment, the wideband cosite interference cancellation system 20 eliminates interfering signals between two or more co-located transceivers, two of which are shown for ease of explanation, i.e., transceivers 1, 5. As shown in FIG. 7, a first transceiver 1, including a radio transmitter 21, and a second transceiver 5 including a protected receiver 25.

In an environment clear of reflective obstacles (e.g., no multi-path sources present), the spatially coupled signal 3 from antenna 2 to antenna 4 would be received unchanged except for the propagation delay which would be fixed. However, in a typical multi-path laden environment, the dominant path of the spatially coupled signal 3 varies with a changing multipath environment of a platform in motion.

In the embodiments to be described, a signal, transmitted from a transceiver, is correlated with two separate and distinct delayed versions of itself (e.g., in a two tap embodiment), with the respective autocorrelation results being indirectly proportional to the product of the signal bandwidth and relative delta time difference. In a two tap configuration, each of the two time-delayed sample signals have different time mismatches with the reference signal. The time mismatches are purposefully designed to provide sufficient autocorrelation differences that can be sensed and used to control the time delay adjustment of a variable delay line until a steady-state solution is reached where the two taps bracket the desired (ideal) time delay relative to the reference signal which allows weighting and summation and thus minimizes interference.

In accordance with a method for minimizing interference between two or more co-located transceivers, it is contemplated to measure the respective time mismatch autocorrelations to determine their relative magnitudes and adjust the respective coupled signal time delay so as to arrive at the desired (ideal) time delay, matching the propagated signal path length, thus allowing minimization of interference.

In operation, system dynamics cause changes in the coupling between a transmit antenna 2 of transceiver 1 and a receive antenna 4 of transceiver 5 on a co-located platform necessitating dynamic, real-time corrective measures to compensate for the changing dynamics. The disclosure provides these corrective measures over a greater range than previously possible, as will be described.

It is noted that the transceivers 1, 5 can operate at any Rf frequency including, for example, in the high frequency (HF), very high frequency (VHF) and ultra-high frequency (UHF) spectrums.

It should be understood that in different embodiments, the cosite cancellation system for the elimination of interfering signals between radio transceivers 1, 5, is adapted to be coupled to either transceiver 1, transceiver 5 or other type of device capable of transmitting and/or receiving electronic signals. It should be understood, however, that while the presently described exemplary embodiment assigns transceiver 1 as an interfering transmitter and further assigns transceiver 5 as a protected receiver, each transceiver 1, 5 may function independent of the other transceiver such that they alternate in being viewed as either the interfering transmitter or protected receiver depending upon the specific needs of the user. For ease of explanation, however, the following description will only address a single functional aspect.

In order to substantially eliminate the effect of interfering signals introduced by transceiver 1, an improved cancellation system 20, according to one embodiment, is electrically coupled to transceiver 5, the operation of which is to be described as follows.

With continued reference to FIG. 7, interfering transmitter 21 of transceiver 1 transmits an RF signal through antenna 2 which couples spatially 3 either directly or through a multi-path environment into a second antenna 4 connected to a receiver 25 of transceiver 5 on the same platform. Without the aid of improved cosite cancellation system 20, this coupled energy interferes in a non-protected receiver with its desired reception of a distant transmission. The interfering transmitter 21 thus becomes a collocated source of interference. Therefore, it is desired to protect the receiver 25 from the interfering transmitter 21. This is achieved via improved cosite cancellation system 20 to reduce this unintended interference.

In an embodiment, the cancellation system 20 is comprised of an adaptive time delay control (ATDC) system 10 and an inline variable delay 190. The ATDC 10 is configured to adjust the inline variable delay 190. As shown, Inline variable delay 190 is comprised of conventional cable delay, $t_a$ 80, and variable delay element $t_v$ 11. In some embodiments, Placeholder $t_b$ 82 may be included as part of variable delay line 190. Placeholder $t_b$ 82 refers to all other signal processing functions that may be used with inline delay, either fixed or variable. The fixed and variable delay elements are configured to match a dynamically changing spatial coupling delay between antenna 2 and antenna 3, the uncontrolled propagation path. Other embodiments may further include a pedestal delay $t_c$ 69, which can be a fixed or a variable delay, in the antenna signal path 30 to allow the insertion of implementation delays or additional signal processing functions in the variable delay line 190. Herein, inline refers to an action or process that generates an immediate change, upon signals passing through, at the output of the system where offline refers to action or processes that may use samples of signals passing through but do not impact the signals passing through until a result is reached and a change is made to the inline processes.

The cancellation system 20 further includes an adaptive control loop (ACL) 6 configured to perform instantaneous adjustments of the time-adjusted coupled signal input 8, in both phase and amplitude, to maximize the cancellation of the transmission path interference antenna signal 30.

In operation, cosite interference cancellation system 20 samples, via coupler 7, a transmission signal 40 emitted from interfering transmitter 21 of transceiver 1. The transmission signal 40 is preferably sampled just before the transmitting antenna 2, specifically at transmission sample pickup point 7. The sampled transmission signal 40 is provided as one input to the fixed cable delay 80, $t_a$ of variable delay line 190.

It should be appreciated that, as the environment changes, the spatial coupling delay between antenna 2 and antenna 4 is dynamically changing over time. To compensate for the dynamically changing spatial coupling delay, an adaptive time delay control system (ATDC) 10 adjusts the inline variable delay 190 to match the dynamically changing spatial coupling delay. The matching process performed by the ATDC system 10 is required by the adaptive control loop (ACL) 6 to achieve maximum cancellation of the undesired interfering portion of antenna signal 30 in the dynamically changing environment.

As part of this process of compensation for the dynamically changing spatial coupling delay, a fixed cable delay 80, $t_a$, is ideally adjusted to maximize the useful operating range of the variable time delay element 11, $t_v$, such that the totality of delays introduced between points 7 and 8, when summed with the variable time delay element 11 at its minimum setting, will have the minimum typical spatial coupling delay from antenna 2 to antenna 4 as when there is a direct path with no multipath delays. It should therefore be understood that the fixed cable delay 80, $t_a$, represents a baseline delay of variable delay line 190 for a baseline case for the direct path with no multipath delays. This baseline delay is dynamically adjusted for greater delays as needed to compensate for multipath delays.

The following description provides further details of the configuration and function of the Adaptive Time Delay Control System 10, generally described above with reference to FIG. 1.

Adaptive Time Delay Control System 10

The adaptive time delay control system (ATDC) 10 requires two inputs. A first input, a reference signal 56 which is a sample of the received antenna signal 30, including the interfering transmitted signal 40 of the receive antenna sampled through a coupler 12. A second input to ATDC 10 is a delayed transmission signal 55, which is sampled at sample point 85 of the variable delay line 190. The sample point 85 is located downline from all of the coupled path delays of variable delay line 190. In Correlator 100, splitter 31 of ATDC 10 splits the delayed transmission signal 55 into two signals, i.e., an early (0 delay) signal 14 and a late signal path 15, further delayed ($2\Delta T$ delay) to become the late path offset delayed transmission signal 59. Each of the two signals 14, 59 are correlated with respective delayed samples 29a, 29b of reference signal 56. The delayed samples 29a, 29b are derived from signal 28 having a centering delay 24 of ($\Delta T$).

In one embodiment, the autocorrelation may be performed by a simple mixing process, to form two samples of autocorrelation 32a, 32b with time. Other well-known and future envisioned techniques for performing autocorrelation, convolution or equivalent process are within contemplation of the disclosure.

With continued reference to FIG. 7, to form autocorrelation sample 32a, mixer 26 receives a first input of delayed reference 29a from divider 23 and a second input of the early signal 14. To form autocorrelation sample 32b, mixer 27, similarly receives a first input of delayed reference 29b from divider 23 and its second input from the late signal 59. The two autocorrelation samples 32a and 32b are differenced, such as shown in operational amplifier 16 to form error signal 61 and, when selected, optionally integrated in low-pass filter 17 to smooth transitions.

Similarly, to form autocorrelation sample 32a', mixer 26' receives a first input of delayed reference 29a' from divider 23' and a second input of the early signal 14'. To form autocorrelation sample 32b', mixer 27', similarly receives a first input of delayed reference 29b' from divider 23' and its second from the late signal 59'. The two autocorrelation samples 32a' and 32b' are differenced, such as shown in operational amplifier 16' to form error signal 61' and, when selected, optionally integrated in low-pass filter 17' to smooth transitions.

The resulting control signal 62 can, in some embodiments, control a voltage controlled delay line, or as shown in FIG. 7, the resulting control signal 62 is converted to a digital control signal 64 in A/D converter 18 which controls the digitally controlled delay line 190 by adjusting the internal switches controlling signal path.

It should be understood that by virtue of control signal 64 controlling the variable delay line 190, the total coupled path delay of a signal originating from transmitting (interfering) antenna point 7, through the variable delay line 190, to input port 8 on the ACL 6 is dynamically and continuously adjusted, in accordance with disclosure principles, to compensate for the dynamically changing spatial coupling delay by matching the transmission path delay starting from point 7 and continuing through points 2, 3, and 4, and finally terminating in input port 9 of the ACL 6.

Interference Cancellation System 6

A time delayed sample of transmission signal 40 is output from variable delay line 190 as the delayed coupled signal 57 and supplied to auxiliary port 8 of ACL 6. Received antenna signal 30 is fed into reference port 9 of ACL 6. A cancellation signal 65 is generated by ACL 6 via the processes of autocorrelation 66, integration 67, and finally by applying a complex weight 68 of phase and amplitude. The cancellation signal 65 is provided to summing junction 70. It is noted that when the cancellation signal 65 is injected into summing junction 70 it has substantially the same amplitude as the transmitted interference portion coupled through the air from antennas 2 to antenna 3, of the receive antenna signal 30, i.e., Transmitted signal 40 coupled energy, however, the cancellation signal 65 is manipulated so that it is 180° out of phase with the interfering antenna signal transmitted portion of antenna signal 30, propagated and received by antenna 4 and included in antenna signal 30 so as to substantially cancel the interfering signal. As a result, the signal remaining on the protected output 58 is substantially the same as the received antenna signal 30 provided by receiver antenna 4 without the undesired contribution from interfering transmitter 1.

ATDC Response Time

The response time of the ATDC 10 is a function of signal bandwidth, the tap spacing ($\Delta T$), loop gain (G), and integration time constant (T). Standard control loop theory applies to the design of the loop to assure stability while allowing timely convergence. Too fast of a response allows oscillations and noisy wanderings of the control signal and thus the time delay. Too slow of a response will not allow the system to respond to dynamics of the platform environment. A value of the tap spacing, $\Delta T$ needs to be selected such that it is small enough so the autocorrelation product of the signals is monotonic in the region of $\pm\Delta T$ but large enough to allow sensing of the autocorrelation difference without allowing noise to unduly perturb the control. There have been many examples in prior art of adaptive arrays to improve the performance of the control loops by the use of automatic Gain Control (AGC) and limiter circuitry that are also applicable to these control loops.

The signal bandwidth can limit the range of operation of the ATDC because of the rapid degradation of the autocorrelation with time. The range of operation can be increased by limiting the bandwidth of the signal autocorrelation by filtering, thus decreasing the rate of decay of the autocorrelation function with time mismatch. This comes at the expense of robustness to platform dynamics by slowing the response time, where this system combines them to preserve benefits of each while minimizing the disadvantages of each. Range of operation can also be increased by adding more taps at spacing $\Delta T$ and combining autocorrelations from all taps to determine direction of time adjustment.

It should be understood that since the improved cosite interference (ICS) system 20 also has an ACL 6 with time-varying function, the time constant of the ATDC control loop has to be adjusted such that the ACL 6 control can track the variation of the ATDC delay.

It should also be understood that some ICS functions will have a time-varying property that could affect the match established through the use of this time delay control method. Such functions should be implemented with a position of $t_a$ 80, or $t_b$ 82, someplace after the transmission sample pickup point 7 and before the delayed sample pick-off point 85. Such functions should have their temporal response times adjusted with those of the ATDC 10 and ACL 6 to maximize system response time of improved interference cancellation system 20.

It should be understood that transmission signals of other modulations and spectral characteristics will have different signal autocorrelation functions than those shown in FIG. 2. Design of the tap spacing and the control loop can be adjusted to work with these signals with restrictions of working within region of monotonic decay of the autocorrelation function.

It is recognized that the integration of the autocorrelation signals 32a-b could take place before the differencing function.

It is recognized that the $\Delta T$ offset can be moved to many other locations to yield the same autocorrelation relationships in each path and that this exact configuration is for example only.

Those knowledgeable in the art will recognize that there are many alternative implementations for the discriminator function, which is shown in the present exemplary embodiment as a simple differencing operation. It is appreciated that some techniques are more suitable for scenarios where there is lower amplitude and phase mismatch in the two signal paths across the band of operation, while other techniques are more suitable for scenarios where there is higher amplitude and phase mismatch in the two signal paths across the band of operation. Moreover, each of the alternative techniques has differing levels of associated computational burden to accomplish the function. The specific implementation chosen can therefore be a function of the type of impairment(s) in the signal path (co-channel interference, noise, multipath, amplitude/phase mismatch, bandlimiting, etc.).

It is recognized that some prior art systems may utilize an initial or quiescent value of the digital control word (e.g., T, as the starting point value). A number of prior art processes in the arena of adaptive arrays have been used for this initialization. An example of such an initialization value can be, for example, based upon the platform dimensions and element locations.

It is recognized that the value out of the correlators for autocorrelation calculation can vary with signal level and that the use of additional gain, AGC or limiters before the correlation function can improve system performance.

It is recognized that the correlator using a signal with BW/2 could have had their error function increased by increasing the interval of $\Delta T$, having a similar effect of raising the gain out of the correlators.

It is recognized that some systems may not desire continuous operation of the adaptive time control but may desire operation only to point of steady state on turn on or by external initialization and that a number of methods from the prior art in adaptive arrays have been used for the function of freezing or holding the adapted value of the digital control word.

Exemplary Application

Wideband Adaptive Null Steering System

Figure 8:
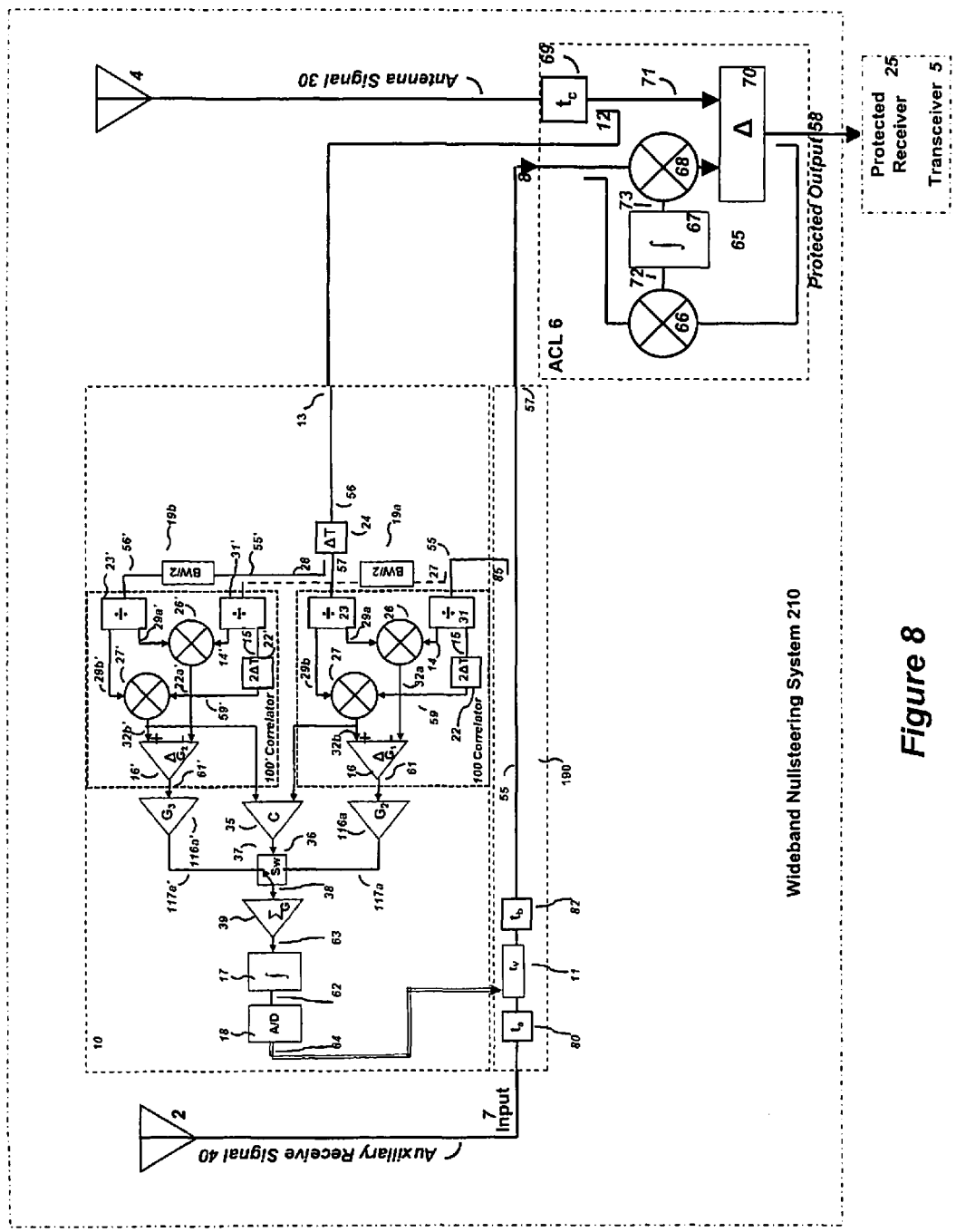
FIG. 8 illustrates an application of the Adaptive Time Delay Control system of FIG. 6 in a wideband nulling system for cancellation of a common wideband interference signal arriving at two independent elements, according to one embodiment.

Referring now to FIG. 8 there is shown an embodiment of an improved Channel matching system 10 applied to a wideband adaptive null steering system 200 to facilitate the steering of a null to an interfering signal. This improved Channel matching system 10 extends this capability to form nulls with a broader bandwidth. In this Figure, identical or corresponding elements and components have the same reference numerals as those in FIG. 6. In this application, input 7 is the signal from a second receive antenna.

Exemplary Application

Wideband Adaptive Beam Steering System

Figure 9:
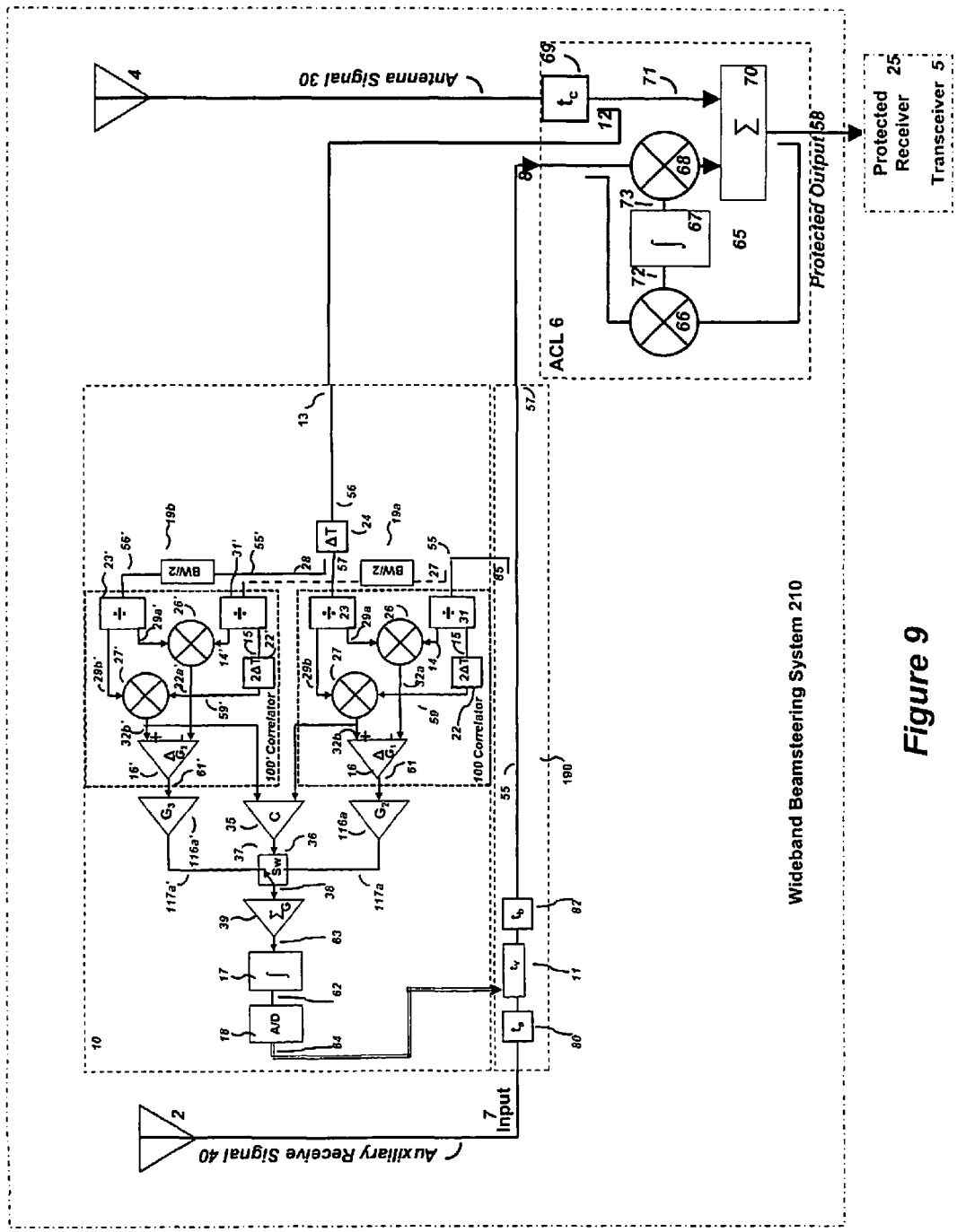
FIG. 9 illustrates an exemplary application of the Adaptive Time Delay Control system of FIG. 6 in a wideband beamforming system for coherently summing a common transmitted signal arriving at two independent elements, according to one embodiment.

FIG. 9 illustrates one embodiment of an improved channel matching system 10 applied to a wideband adaptive beam steering system 210 to facilitate the steering of a beam to a desired signal. In the prior art, this has been applied to closely spaced elements (as a function of RF wavelength and bandwidth) but this improved Channel matching system 10 extends this capability to the coherent combining of widely spaced antennas. In FIG. 9 there is shown identical or corresponding elements and components have the same reference numerals as those shown in FIG. 6. In this exemplary application, input 7 is the signal from a second receive antenna.

The foregoing is to be construed as only being an illustrative embodiment of this disclosure. Persons skilled in the art can easily conceive of alternative arrangements providing functionality similar to this embodiment without any deviation from the fundamental principles or the scope of the disclosure.

What is claimed is:

1. A method of adjusting a delay in a controlled propagation path of a first signal ($S_1$) to that of an uncontrolled propagation path of a second signal ($S_2$) using a time-delay based control architecture, the method comprising:
   a) generating a first autocorrelation value from a sampled first signal ($S_{1,0}$) received over the controlled propagation path and a delayed sampled second signal ($S_{2,1}$) received over the uncontrolled propagation path;
   b) generating a second autocorrelation value from a delayed sampled first signal ($S_{1,2}$) and the delayed sampled second signal ($S_{2,1}$);
   c) computing a first difference value by subtracting the first autocorrelation value from the second autocorrelation value;
   d) amplifying the first difference value by a first gain;
   e) selecting one of the first and second autocorrelation values as a first autocorrelation selection value;
   f) generating a third autocorrelation value from a sampled band-limited first signal ($S'_{1,0}$) and a delayed sampled band-limited second signal ($S'_{2,1}$);
   g) generating a fourth autocorrelation value from a delayed sampled band-limited first signal ($S'_{1,2}$) and the delayed sampled band-limited second signal ($S'_{2,1}$);
   h) computing a second difference value by subtracting the third autocorrelation value from the fourth autocorrelation value;
   i) amplifying the second difference value by a second gain;
   j) selecting one of the third and fourth autocorrelation values as a second autocorrelation selection value;
   k) comparing the first autocorrelation selection value to the second autocorrelation selection value to select the larger of the first autocorrelation selection value and the second autocorrelation selection value;
   l) selecting one of the first or second amplified difference value associated with the larger autocorrelation selection value as a control error signal;
   m) filtering the control error signal to form a variable delay control signal;
   n) applying the variable delay control signal to a variable delay device in the controlled propagation path of the first signal;
   o) repeating steps (a)-(n) until the magnitude of the variable delay control signal is less than a first predetermined threshold, thereby indicating a time delay match between the outputs of the first received signal and the second received signal,
   where $S_{M,N}$ is signal M with a delay of N $\Delta T$,
   where $S'_{M,N}$ is a band limited signal M with a delay of N $\Delta T$, and
   where M is the signal index, N is the delay index, and $\Delta T$ is the unit delay time.

2. The method of claim 1, wherein generating the first autocorrelation value comprises:
   a) receiving the first signal ($S_1$) over the controlled propagation path;
   b) delaying the first signal ($S_1$) by a voltage controlled variable time delay;
   c) sampling the delayed first signal yielding the sampled first signal ($S_{1,0}$);
   d) receiving the second signal ($S_2$) over the uncontrolled propagation path;
   e) sampling the second signal ($S_2$) yielding a sampled second signal ($S_{2,0}$);
   f) forming a delayed sample of the sampled second signal ($S_{2,0}$) yielding the delayed sampled second signal ($S_{2,1}$);
   g) generating the first autocorrelation value from the sampled first signal ($S_{1,0}$) and the delayed sampled second signal ($S_{2,1}$).

3. The method of claim 1, wherein generating the second autocorrelation value comprises:
   h) receiving the first signal ($S_1$) over the controlled propagation path;
   i) delaying the first signal ($S_1$) by a voltage controlled variable time delay;
   j) sampling the delayed first signal yielding the sampled first signal ($S_{1,0}$);
   k) receiving the second signal ($S_2$) over the uncontrolled propagation path;
   l) sampling the second signal ($S_2$) yielding a sampled second signal ($S_{2,0}$);
   m) forming a delayed sample of the sampled first signal ($S_{1,0}$) yielding the delayed sampled first signal ($S_{1,2}$);
   n) forming a delayed sample of the sampled signal ($S_{2,0}$) yielding the delayed sampled second signal ($S_{2,1}$);
   o) generating the second autocorrelation value from the delayed sampled first signal ($S_{1,2}$) and the delayed sampled second signal ($S_{2,1}$).

4. The method of claim 1, wherein generating the third autocorrelation value comprises:
   band-limit filtering the sampled first signal ($S_{1,0}$) to yield a band-limited first signal ($S'_1$);
   band-limit filtering a sampled second signal ($S_{2,0}$) to yield a band-limited second signal ($S'_2$);
   sampling the band-limited first signal ($S'_1$) to yield the sampled band-limited first signal ($S'_{1,0}$);
   sampling the band-limited second signal ($S'_2$) to yield a sampled band-limited sampled second signal ($S'_{2,0}$);
   generating a delayed sample of the sampled band-limited second signal ($S'_{2,0}$) to yield the delayed sampled band-limited second signal ($S'_{2,1}$);
   generating the third autocorrelation value from the sampled band-limited first signal ($S'_{1,0}$) and the delayed sampled band-limited second signal ($S'_{2,1}$).

5. The method of claim 1, wherein generating the fourth autocorrelation value comprises:
   band-limit filtering the sampled first signal ($S_{1,0}$) to yield a band-limited first signal ($S'_1$);
   band-limit filtering a sampled second signal ($S_{2,0}$) to yield a band-limited second signal ($S'_2$);
   sampling the band-limited first signal ($S'_1$) to yield the sampled band-limited first signal ($S'_{1,0}$);
   sampling the band-limited second signal ($S'_2$) to yield a sampled band-limited sampled signal ($S'_{2,0}$);
   generating a delayed sample of the sampled band-limited first signal ($S'_{1,0}$) to yield the delayed band-limited first signal ($S'_{1,2}$);
   generating a delayed sample of the sampled band-limited second signal ($S'_{2,0}$) to yield the delayed sampled band-limited second signal ($S'_{2,1}$);
   generating the fourth autocorrelation value from the delayed sampled band-limited first signal ($S'_{1,2}$) and the delayed sampled band-limited second signal ($S'_{2,1}$).

6. The method of claim 1, wherein process of steps (a)-(o) can be restarted if it is determined that an absolute value of the variable delay control signal is greater than a second predetermined threshold thereby indicating a time delay match between the outputs of the first received signal and the second received signal has changed, wherein a third predetermined threshold is greater in magnitude than the second predetermined threshold.

7. The method of claim 6, wherein the second predetermined threshold is set by a maximum time decorrelation between the first received signal output and the second received signal that would result in a quantifiable performance degradation of a system.

8. The method of claim 1, wherein steps (a)-(n) are repeated continuously to track changes in the uncontrolled propagation path.

9. The method of claim 1, wherein the second signal and the first signal are both derived from a known source.

10. The method of claim 1, wherein steps (a)-(m) are performed offline.

11. The method of claim 1, wherein the delay of the delayed sampled first signal ($S_{1,2}$) in step (b) is substantially twice the delay of the delayed sampled second signal ($S_{2,1}$) in step (a).

12. The method of claim 1, wherein the delay of the delayed sampled band-limited first signal ($S'_{1,2}$) in step (g) is substantially twice the delay of the delayed sampled band-limited second signal ($S'_{2,1}$) in step (f).

13. The method of claim 1, further comprising computing in steps (e) and (j) the sum of the pair of autocorrelation values for later comparison in step (k).

14. The method of claim 1, wherein the bandwidth of the band-limited signals of step (f) is 1/N of the non-band-limited first and second sampled signals.

15. The method of claim 14, wherein N=2, allowing doubling of a control range.

16. The method of claim 1, further comprising:
repeating steps (f)-(j) with additional filtering such that the bandwidth of the next level of filtering of the first and second sampled signals of step (f) is 1/(M*N) of the non-band-limited first sampled signal,
adding results of repeated (j) to steps (k) and (l), thereby allowing extension of a control range.

17. The method of claim 16, wherein the product (M*N) is a power of 2, thereby allowing additional doubling of the control range.

18. The method of claim 1, where an initial and a quiescent value of the time delay in the controlled propagation path of the first received signal is set to be equivalent to a platform dimension.

19. The method of claim 1, whereby step (o) further comprises:
repeating steps (a)-(n) until the variable delay control signal is stable at a value within a third predetermined threshold for a predetermined interval, thereby indicating a time delay match between the outputs of the first received signal and the second received signal.

20. The method of claim 1, wherein the first predetermined threshold recited in step (o) is set by a decorrelation between the first received signal output and the second received signal such that no performance degradation of the signal processing of the system is realized.

21. The method of claim 1, wherein the variable delay control signal is not applied unless it exceeds a fourth predetermined threshold set by the smallest incremental voltage that would change the delay of the controlled variable delay device.

22. The method of claim 1, wherein the variable delay control signal is not applied unless it exceeds a fifth predetermined threshold set by the voltage representing a control signal of a digitally switched delay line.

23. A system, comprising:
(A) a variable delay line (19) for adjusting a signal propagation time of a first sampled signal (40), the variable delay line (19) comprising:
 (i) at least one fixed delay element (80, 82) in series with a propagated received signal path;
 (ii) a variable delay element (11) for continuously varying a delay of the first sampled signal (40) to implement a match between the first sampled signal (40) and a second sampled signal (30) yielding a delayed first signal;
(B) an adaptive time delay control (ATDC) system (10) having two levels of correlation, said system configured to calculate the delay to be added to a first propagation path to achieve the match of the first sampled signal having passed through a controlled propagation path with a second sampled signal having passed through an uncontrolled propagation path, comprising:
 a reference port (13) for receiving a reference signal sample (56) of an antenna signal (30) including a transmission signal (40) transmitted from a transmission antenna (2) and received at a local receive antenna (4) via the uncontrolled propagation path (3);
 a first delay (24) for delaying the reference signal sample (56) to generate a delayed reference signal sample (57) that is delayed relative to a delayed signal (55);
 a first band-limiting filter (19b) for band-limiting the delayed reference signal sample (57) to form a band-limited delayed reference signal (56');
 a second band-limiting filter (19a) for band-limiting a sample of the delayed signal (55) to form a band-limited delayed signal (55');
 a first splitter (23) for splitting the delayed reference signal sample (57) into a first delayed reference signal sample (29a) and a second delayed reference signal sample (29b);
 a second splitter (31) for splitting the delayed signal (55) into a first delayed signal sample (14) and a second delayed signal sample (15);
 a second delay (22) for further delaying the second delayed signal sample (15) as an offset delayed signal sample (59);
 a first ATDC mixer (26) for mixing the first delayed reference signal sample (29a) and the first delayed signal sample (14) to output a first autocorrelation sample (32a);
 a second ATDC mixer (27) for mixing the second delayed reference signal sample (29b) and the offset delayed signal sample (59) to output a second autocorrelation sample (32b);
 a first differencing amplifier (16) for computing a difference of the first autocorrelation sample (32a) and the second autocorrelation sample (32b) to yield a first error signal (61);
 a third splitter (23') for splitting the band-limited delayed reference signal (56') into a first band-limited delayed reference signal sample (29a') and a second band-limited delayed reference signal sample (29b');
 a fourth splitter (31') for splitting the band-limited delayed signal (55') into a first band-limited delayed signal sample (14') and a second band-limited delayed signal sample (15');
 a third delay (22') for further delaying the second band-limited delayed signal sample (15') as an offset band-limited delayed signal sample (59');
 a third ATDC mixer (26') for mixing the first band-limited delayed reference signal sample (29a') and the first band-limited delayed signal sample (14') to output a third autocorrelation sample (32*a*');
a fourth ATDC mixer (27') for mixing the second band-limited delayed signal sample (29*b*') and the offset band-limited delayed signal sample (59') to output a fourth autocorrelation sample (32*b*');
a second differencing amplifier (16') for computing a difference of the third autocorrelation sample (32*a*') and the fourth autocorrelation sample (32*b*') to yield a second error signal (61');
a first amplifier (116*a*) for amplifying the first error signal (61) to yield an amplified first error signal (117*a*);
a second amplifier (116*b*) for amplifying the second error signal (61') to yield an amplified second error signal (117*a*');
a comparator (35) for receiving the fourth autocorrelation sample (32*b*') as a first input and the second autocorrelation sample (32*b*) as a second input to yield a control signal (36);
a switch (37) for selecting one of the first amplified error signal (61') or the second amplified error signal (61) responsive to said control signal (36) yielding a selected error signal;
an amplifier (39) for amplifying the selected error signal (38);
an integrator (17) for integrating the amplified selected error signal (63) yielding an integrated error signal (62); and
an A/D converter (18) for converting the integrated error signal (62) to a digital integrated error signal 64 to control the variable delay line (19), when the variable delay line is digitally controlled; and
(C) an adaptive control loop (6) for adjusting a complex weighting of the delayed first signal (57) to maximally cancel any similar signals in the second signal received in antenna signal (30).

24. The system of claim 23 where the first sampled signal is a sample of a co-sited transmitted signal and an adaptive loop control (6) is used to null any portion of the second sampled signal (30) comprised of a coupled signal (40).

25. The system of claim 23 where the first sampled signal (40) is a sample of a second received antenna and an adaptive loop control (6) is used to null a strong interferer received both in first sampled signal (40) and the second sampled signal (30).

26. The system of claim 23 where it is a wideband adaptive beam steering system where the first sampled signal (40) is a sample of a second received antenna and the adaptive loop control (6) is used to maximize the desired signal received both in first sampled signal (40) and the second sampled signal (30).

27. The system of claim 23, wherein the variable delay line (19) is a voltage controlled delay line.

28. The system of claim 23, wherein the variable delay line (19) is a digitally controlled delay line.

29. The system of claim 23 wherein the adaptive control loop comprises:
a reference port (9) for receiving an antenna signal (30);
an auxiliary port (8) for receiving a delayed and matched coupled signal (57) from the variable delay line (19);
a complex correlator (66) for generating an error correlation signal (72);
an integrator (67) to smooth transients on the error correlation signal (72) to form adaptive weight control signals (73);
a complex phase and amplitude weighting device (68) having a first input and a second input, said first input for receiving said delayed and matched coupled signal (57), said second input for receiving said complex adaptive weight control signals (73) to weight the delayed and matched coupled signal (57) to produce a weighted delayed and matched coupled signal (65);
a summing junction (70) having a first and second input, said first input for receiving said weighted delayed and matched coupled signal (65) output from said complex phase and amplitude weighting device (68),
wherein said second input receives an antenna receive signal (71) to yield a protected output (58).

30. The system of claim 23 wherein the adaptive control loop uses a negative feedback for nulling.

31. The system of claim 23 wherein the adaptive control loop uses a positive feedback for beam-steering.

* * * * *